United States Patent [19]
Fagan et al.

[11] 3,989,003
[45] Nov. 2, 1976

[54] PAINT SPRAY CONTROL SYSTEM

[75] Inventors: John C. Fagan; Robert M. Bania, both of Oak Lawn, Ill.

[73] Assignee: The Sippican Corporation, Midlothian, Ill.

[22] Filed: Mar. 15, 1974

[21] Appl. No.: 451,553

[52] U.S. Cl. .................................. 118/2; 118/11; 118/324
[51] Int. Cl.$^2$ ........................................ B05C 11/02
[58] Field of Search ................. 118/2, 7, 8, 11, 324; 340/172.5

[56] References Cited
UNITED STATES PATENTS

| | | | |
|---|---|---|---|
| 3,121,024 | 2/1964 | Wampler et al. | 118/2 |
| 3,166,438 | 1/1965 | Wampler et al. | 118/2 |
| 3,255,037 | 6/1966 | Knight et al. | 118/2 |
| 3,593,308 | 7/1971 | Fagan | 118/2 X |
| 3,646,521 | 2/1972 | Porter | 118/2 X |

*Primary Examiner*—John P. McIntosh
*Attorney, Agent, or Firm*—Jack C. Berenzweig; Jerold A. Jacover

[57] ABSTRACT

A paint spray control system for controlling a paint spray apparatus including a paint spray station having at least one spray gun and a conveyor for transporting objects of diverse styles is disclosed. The control system includes input means for depositing different sets of data words into a memory, some of the data words being in a first set representative of a predetermined position of an object of predetermined style and others being in a second set representative of the style of a specific object transported by the conveyor. The control system further includes means for supplying an increment signal representative of the position of an object transported by the conveyor relative to the spray station, and comparison means for comparing the increment signal and a specific one of the data words in the second set with the position and style information contained in data words in the first set. After locating the data word in the first set having position and style information corresponding to the location signal and the specific data word in the second set, an energizing signal is produced which causes the spray gun in the spray station to be positioned and actuated.

13 Claims, 11 Drawing Figures

FIG. 1
MEMORY

| Word | Address | Decimal Data | Binary Data |
|---|---|---|---|
| Style Word 1 | 0000 | 3 1152 | 11 0001 0001 0101 0010 |
| Style Word 2 | 0001 | 3 0017 | 11 0000 0000 0001 0111 |
| Style Word 1 | 0002 | 3 0286 | 11 0000 0010 1010 0110 |
| Style Word 2 | 0003 | 3 6000 | 11 0110 0000 0000 0000 |
| | | * * * | |
| Job Word 1 | 0900 | 1 0010 | 01 0000 0000 0001 0000 |
| Job Word 2 | 0901 | 1 2374 | 01 0010 0011 0111 0100 |
| Job Word 1 | 0902 | 1 0002 | 01 0000 0000 0000 0010 |
| Job Word 2 | 0903 | 1 5196 | 01 0101 0001 1001 0110 |
| | | * * * | |
| Recognition Word 1 | 0932 | 0 0072 | 00 0000 0000 0111 0010 |
| Recognition Word 1 | 0933 | 0 0105 | 00 0000 0001 0000 0111 |
| Recognition Word 1 | 0934 | 0 0013 | 00 0000 0000 0001 0011 |
| Recognition Word 1 | 0935 | 0 0044 | 00 0000 0000 0100 0100 |
| | | * * * | |
| Color Word 1 | 0950 | 2 0002 | 10 0100 0100 0000 0010 |
| Color Word 2 | 0951 | 2 4406 | 10 0100 0100 0000 0110 |
| Color Word 1 | 0952 | 2 5105 | 10 0101 0001 0000 0101 |
| Color Word 2 | 0953 | 2 5105 | 10 0101 0001 0000 0101 |
| | | * * * | |

| | | * * * | |
|---|---|---|---|
| Job Word 1 | 0900 | 1 0000 | 01 0000 0000 0000 0000 |
| Job Word 2 | 0901 | 1 4114 | 01 0100 0001 0001 0100 |
| Job Word 1 | 0902 | 1 0010 | 01 0000 0000 0001 0000 |
| Job Word 2 | 0903 | 1 5196 | 01 0101 0001 1001 0110 |
| | | * * * | |

FIG. 2

PAINT SPRAY CONTROL SYSTEM

BACKGROUND OF THE INVENTION

The present invention relates generally to spray painting systems of the type having one or more spray stations. In each spray station there is at least one moveable spray gun or nozzle and conveyor means for transporting objects of diverse geometry, such as automobile bodies, past the spray nozzle. More particularly, the invention is directed to an improved control system for automatically regulating the operation of a plurality of spray gun assemblies in accordance with information contained in a memory which relates to the size and style of the object to be sprayed as well as the desired color. Those concerned with the development of a paint spray control system have long recognized the need for developing a spray control which may be pre-programmed to include information relating to the objects to be sprayed that will be retained in the memory indefinitely so as to be recalled whenever it is desired.

Several known prior art spray control systems are able to sense the horizontal direction and position of an object to be sprayed in an area remote from the spray station. One such control system which also includes a means for measuring the vertical height of the part to be sprayed is disclosed in U.S. Pat. No. 3,593,308, issued July 13, 1971 to John C. Fagan and assigned to AMTRON, INC. The spray control system disclosed in this patent includes a means for developing a digitized signal representative of the horizontal and vertical dimension of an object to be sprayed. The digitized information is then fed into a shift register and the output of the shift register actuates spray guns on the spray gun assembly. Means are also provided for moving the spray gun assembly between two vertical limits. In order to accurately measure the vertical dimensions of the part, the above-identified patent utilizes a plurality of shift registers, one shift register being associated with each incremental vertical zone. For example, if ten vertical zones are used, it is necessary to utilize 10 shift registers. After the part to be sprayed has passed through the spray station, all information relating to its size and shape is destroyed.

A second spray control system is disclosed in U.S. Pat. No. 3,646,521, issued Feb. 29, 1971 to Virgil E. Porter and assigned to AMTRON, INC. In this latter patent, a spray control system is provided which utilizes a single memory storage matrix for storing a digitized information signal which is related to the dimensions of the object. The memory storage matrix replaces the need for the plurality of shift registers utilized in U.S. Pat. No. 3,593,308, described above. In this patent, after the part to be sprayed has passed through the spray station, the information stored in the memory is destroyed.

In both of the above described prior art paint spray applications, the spray guns which are utilized in each spray station are continuously vertically reciprocated. The control system, whether it be the shift register or the matrix memory, turns on the guns at the appropriate vertical position if a part is present at that height. If a part to be sprayed is not present at that height, the guns remain off.

SUMMARY OF THE INVENTION

The present invention provides a spray control system which embraces all of the advantages of the above-identified patents but which enables a memory in the control system to be pre-programmed to include the size and shape of all products which may be sprayed by the machine as well as the several colors to be utilized. To attain this, the present invention utilizes a solid-state memory control which stores the style sequences, color controlled instructions, and the jobs in process information in a nondestructive form. In the preferred embodiment, the memory has a capacity for 4096 18 bit words which are divided equally into four groups or quadrants.

As an object, such as an automobile, enters the job input station, an operator enters the style of the automobile as well as the color data into a register. This data is stored in the job portion of the memory until it is later retrieved at the time the job actually enters the spray station. Each job is stored in the memory in sequence so that the job can be operated upon in sequence at each spray station. The storage of this sequence in the core memory allows the retention of the sequence in the event of the power failure. As the automobile passes to the spray station, the job data information is compared to the pre-programmed information within the memory. If a match occurs, the pre-programmed information in the memory then actuates the spray guns in each of the spray stations so as to move the guns to the proper position for spraying. When in the proper position, the memory then actuates the guns and selects the proper color to spray the object. After the automobile has left the several spray stations, the pre-programmed information is retained in the memory.

Therefore, an object of the present invention is the provision of a spray control system in which various objects having diverse geometry may be sprayed at the plurality of paint spray stations whereby the spray stations are controlled by a pre-programmed memory.

Another object is to provide a control apparatus for a spray coating system whereby information as to the geometry of the parts to be sprayed is nondestructively retained in a central memory unit.

A further object is the provision of a paint spray control system which allows for the spraying of a plurality of pre-programmed colors.

Still another object is to provide a control apparatus for a spray coating system which movably actuates the spray control gun in response to pre-programmed signals contained in the memory which are related to the size and shape of the object to be sprayed.

Still another object is to provide an improved coating system for use in operating a spray coating system.

Other objects and many of the attendant advantages of this invention will be readily appreciated as the same becomes better understood by reference to the following detailed description when considered in connection with the accompanying drawings.

FIG. 1 is a data table representing a portion of exemplary data stored in one quadrant of the memory of the invention at selected ones of the 1024 addresses allotted for each quadrant.

FIG. 2 is a table representing some of the job word data temporarily stored in the memory.

DESCRIPTION OF THE MEMORY OF THE INVENTION

Figure 3:
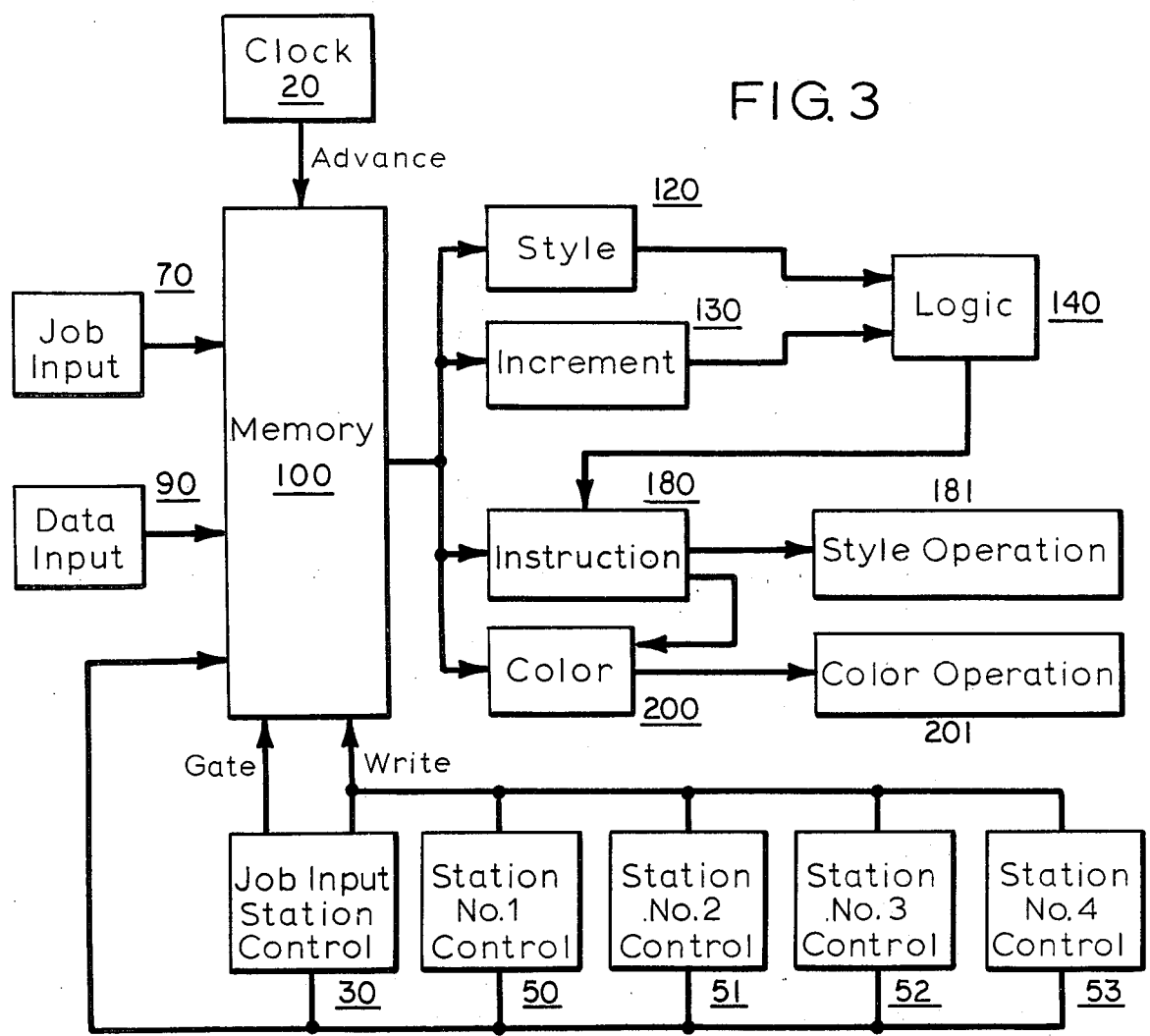
FIG. 3 is a block diagram illustrating the major components of the invention.

The paint spray control system of the invention controls mechanical means, including spray nozzles and paint supply lines used in the operation of painting a plurality of various-shaped objects, particularly automobile bodies. In the preferred embodiment, four spray stations, each having at least one moveable spray gun, and one job input station, are utilized. The heart of the invention resides in a 4096 word memory, each word containing 18 bits of binary data. The memory is divided into four quadrants, each quadrant having a capacity of 1024 words, and each quadrant being further divided into four sets designated as style words, job words, recognition words, and color words.

FIG. 1 depicts a data table representing a portion of the memory containing exemplary style words, job words, recognition words and color words disposed at various ones of the 1024 addresses contained in one quadrant of the memory. More particularly, FIG. 1 shows a set of style words located at addresses 0–899, a set of job words located at addresses 900–931, a set of recognition words located at addresses 932–949, and a set of color words located at addresses 0950–1024. In one preferred embodiment of the invention, each set of words in all four quadrants of the memory is addressed in substantially the same manner shown in the quadrant represented by FIG. 1. It should be observed, however, that in practice, the words can be addressed in any suitable manner, the addresses shown in FIG. 1 being merely exemplary and not limitative.

The meaning of each bit of information comprising the various words in quadrant one of the memory can be best understood by again referring to FIG. 1, and specifically to the column labled "decimal data." The decimal data is, of course, the decimal equivalent of the 18 bits of "binary data" stored in the memory and appearing in the extreme right hand column of FIG. 1. As explained in more detail hereinafter, bits 1–16 in each binary word contain specific data or instruction information, while bits 17 and 18 indicate whether any particular word belongs to a style, job, recognition or color set. More particularly, the left-most or fifth decimal digit in each word corresponds to the binary bits 17 and 18 which designate the set in which any word belongs. Thus, the decimal numbers 3, 1, 0 and 2 in each set of words in FIG. 1 indicates that the words belong to the style word set, the job word set, the recognition word set, and the color word set, respectively.

The even and odd addresses in the style word, job word and color word sets contain different kinds of information and are therefore distinguished in FIG. 1 by referring to them as "words 1" and "words 2," respectively. (The recognition words, however, all contain the same type of information and thus, both odd and even addresses in the recognition word set are known as words 1.) More particularly, style words 1 refer to specific style and increment data corresponding to the type of auto body and its position on the conveyor. Style words 2 refer to a specific instruction or operation to be performed on the auto body defined and positioned according to the data represented by the immediately preceeding style word 1.

The first four decimal digits in each style word 1 contain increment and style information, the style information being contained in decimal digit 1, which corresponds to bits 1–4 in the binary data column. A number 2 in decimal digit 1, for example, may indicate that the auto body is a station wagon. Decimal digits 2, 3, and 4 of style words 1, which correspond to bits 5–16 in the binary data column, represent the distance in inches at which a particular instruction is to be acted upon as an auto body travels along the conveyor of a given spray station. The first style word 1 in FIG. 1, for example, indicates that the instruction at style word 2 can be initiated when the auto style No. 2 has traveled 115 inches. As explained above, the fifth decimal digit, which corresponds to bits 17 and 18 in the binary data column, indicates that the word is a style word.

Style words 2 contain instructions that relate to the immediately preceding style word 1. For example, the word 0017 shown in FIG. 1 may correspond to the instruction, "turn top paint spray machine on." In the exemplary embodiment this instruction applies specifically, though not exclusively, to the decimal style word 1 described as 1152. More particularly, this style word 1 commands the top paint spray machine to turn on whenever a body style corresponding to the number 2, i.e., a station wagon, has traveled 115 inches into the spray station.

The job words 1 convey information regarding the order in which automobile bodies moving along the conveyor should be painted. For example, in the preferred embodiment, the job word 0010 indicates that the automobile body defined by the next succeeding job word 2 will be the next auto body to pass through the job input station. The job word 0001 indicates that the automobile body defined by the next succeeding job word 2 will be the next one to reach spray station No. 1. Similarly, job words 0002, 0003 and 0100 correspond to stations 2, 3 and 4, respectively, though it should be observed that all of these words are selected more or less at random, and are used herein for exemplary purposes only. Job words 2, as intimated, contain color and style codes comprising words designating particular styles and colors. More particularly, the first two decimal digits of each job word 2 correspond to bits 1–8 of the binary data and contain the style code, while the next two decimal digits correspond to bits 9–16 of the binary data and contain the color code.

Color words 1 correspond to the color to be applied to the top of the auto body, and color words 2 correspond to the color to be applied to the side of the auto body. Separation of the color words in this manner readily permits two-tone painting operations. Further, in each color word, the first two decimal digits correspond to binary bits 1–8 and describe a particular color, whereas the next two decimal digits correspond to binary bits 9–16 and describe a particular color code. The meaning and function of the recognition words are explained in greater detail hereinafter.

Style, recognition and color words, whether located at odd or even addresses, correspond to pre-programmed information stored indefinitely in the memory. Job words, on the other hand, are continually being stored, shifted and erased. For example, as shown in FIG. 1, the job word 0010 stored in address 900 is followed by the job word 2 2374 stored in address 901. The job word 1 0010 indicates that the color and style codes corresponding to the next automobile body entering the job input station should be entered at the job word 2 address 901. The job word 2 2374 defines an auto body that has previously passed through the job input station and that has been completely processed at the four paint stations. New data information corresponding to an upcoming automobile body is deposited into the address occupied by 2374. For example, the data 2374 is erased and the new data 4114 is written into address 901. Further, the instruction word 0010 is shifted to the next job word 1 address as shown in FIG. 2. This indicates that the address 903 is now the next address at which the next automobile body entering the job input station is to be entered. In this manner, the proper style and color codes information is continuously applied to the desired stations, new style and color code information is properly inputted, and style and color codes corresponding to operations already completed are erased.

BRIEF DESCRIPTION OF THE OPERATION OF THE INVENTION

FIG. 3 shows a simplified block diagram of the invention and includes a 4096 word memory 100 of the type hereinbefore described. Data is deposited into memory 100 at preselected addresses through means of a data input 90. This data includes preprogrammed style words, recognition words and color words which are stored indefinitely. Job words, which are continuously being inserted, shifted and removed, are deposited through means of job input 70. More particularly, an operator observing automobile bodies traveling along the conveyor in advance of the preparation station, sequentially prepares for deposit in the memory job words 2 containing color and style codes corresponding to each auto body that passes by. A clock 20, rapidly and continuously cycles the memory through all of its 4096 addresses.

When an automobile body reaches the job input station, job input station control circuitry 30 searches memory 100 for the job word 1 denoted decimally as 0010. As explained hereinabove, this job word 1 indicates that the next job 2 2374, for example, is the place in memory where new job information is to be entered. The job word 1 0010 is then erased, and after the memory advances to the next job word 2 address, a latch pulse and a write pulse are generated and passed to memory 100. This permits the last job word 2 prepared by the operator (4114, for example) to be deposited in the memory at the address formerly occupied by the job word 2374 following the now erased job word 0010. When the memory advances to the next job word 1 address, a signal is passed to the memory, coincident with a write pulse, to change that job word 1 to 0010, indicating that the succeeding job word 2 (5196, for example) should be the next place to enter the next job to pass through the job input station. The manner in which these job words are deposited, shifted and erased is illustrated in FIGS. 1 and 2.

When an auto body enters the job input station, other auto bodies, further along on the conveyor, simultaneously enter spray stations Nos. 1, 2, 3 and 4. At each spray station a mechanical switch is set which passes a start pulse to control circuitry 50, 51, 52, 53, controlling the spray guns in spray stations Nos. 1, 2, 3 and 4, respectively. The control circuitry for each of these spray stations operates similarly to that in job input control circuitry 30. More particularly, control circuitry 50 responds to the job word 0001, indicating that the following job word 2 is next to enter spray station No. 1. This job word 2 is then latched into a style circuit 120 where it is used at a later time. Additionally, the preceding job word 1 is erased, and the succeeding job word 1 is converted to 0001, indicating that the next succeeding job word 2 will be next to enter spray station No. 1.

The start pulse initiated at each spray station is also used to energize a counter in increment circuitry 130 which monitors how far into a spray station the auto body has progressed. The style and increment information in blocks 120 and 130 is compared with the style words 1 stored in memory 100 as the memory advances through its 4096 word cycle. When proper comparisons occur, logic circuitry 140 passes signals to instruction circuitry 180. Instruction circuitry 180 retrieves and decodes corresponding style word 2 from memory 100, producing signals which are used to energize style operation circuitry 181. The style operation circuitry includes motors, solenoids and the like, for operating the specific spray paint equipment disposed along the conveyor in each spray station.

Instruction circuitry 180 is also coupled to color circuitry 200 for passing decoded instructions thereto. Color circuitry 200 responds to these decoded instructions by comparing the paint colors being applied to the auto body in a particular spray station with the color of the next auto body to be painted. If these colors are at variance, purge signals are generated to clean the color supply lines. At the same time, a color word corresponding to the next color to be painted is shifted into an appropriate color register. After the purging process is completed, the color information stored in the color register is decoded and passed through a hard wired circuit to color solenoids which open the paint supply lines connected to the particular color called for. In this manner, the equipment in each spray station is properly supplied, and properly actuated, to automatically paint the automobile bodies as they travel along the conveyor.

DETAILED DESCRIPTION AND OPERATION OF AN EXEMPLARY EMBODIMENT OF THE INVENTION

A. Description of an Exemplary Spray Station

Figure 4:
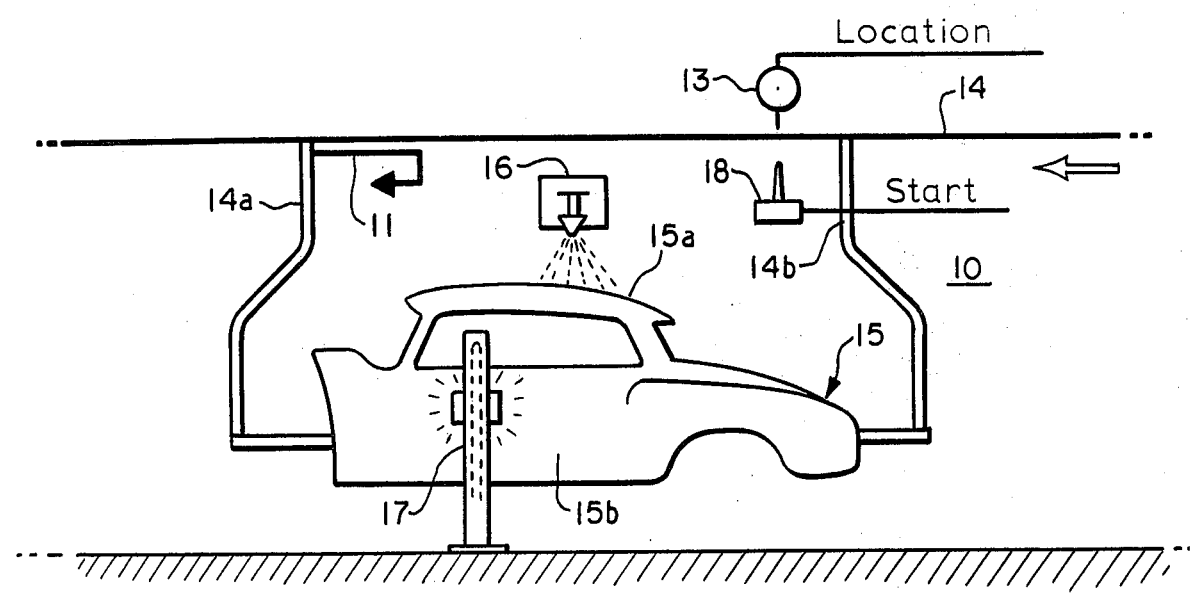
FIG. 4 is a front elevational view of a conveyor transporting an object to be painted by spraying means controlled by the paint control system of the invention.

FIG. 4 represents one of the four spray stations which are controlled by the paint control system of the invention. It should be observed at the outset, however, that any reasonable number of spray stations can be used, four being preferable in the exemplary embodiment herein disclosed. Each spray station 10 includes a conveyor 14 adapted to carry objects of varying shape past a plurality of paint spray nozzles such as those represented by reference numerals 16 and 17. In the exemplary embodiment, the objects to be painted are automobile bodies of multifarious styles such as sedans, hardtops, station wagons, etc. The invention, of course, can be adapted for use with numerous objects other than automobile bodies, and therefore, this exemplary case should in nowise be construed as limitative.

An automobile body 15, having a top deck 15a and a side deck 15b is moved through paint spray station 10 by means of a pair of supports 14a and 14b, extending downwardly from conveyor 14, and secured respectively to the front and rear portions of auto body 15. Disposed at the entrance of spray station 10 is a limit switch 18 actuated by a mechanical contact 11 secured to support 14a. Each time an auto body enters spray station 10, contact 11 causes limit switch 18 to generate a START pulse whose function is explained in greater detail hereinafter. Also disposed at the entrance of spray station 10 is a pulser 13, timed to produce one LOCATION pulse for each inch of travel of auto body 15 through spray station 10. Preferably, a single pulser 13, disposed at spray station No. 1, is used to produce LOCATION pulses for each spray station.

Prior to reaching spray station 10, each auto body carried by conveyor 14 passes by a plurality of photoelectric devices (not shown) which are preferably disposed about the job input station. Each of the photoelectric devices are adapted to produce an interruptable light beam across the path of travel of the auto body. The height and location of the photo-electric devices are arranged so that at the instant of job input limit switch closure, the interruption of their associated light beams uniquely describes one of the plurality of differently-shaped auto bodies which may be passed through spray station 10. Logic means (not shown) are coupled to the photo-electric devices and are adapted to produce a three decimal digit recognition word corresponding to the particular shape or style of the auto body instantaneously passed through the spray station. This recognition word, which contains additional style information in a fourth decimal digit, can be checked against the job word 2 style code corresponding to the auto body about to enter the spray station. If the style information does not match, an error signal can be generated to warn the operator that a problem may exist in the just entered data. A few exemplary recognition words are shown in FIG. 1.

B. Description of Job Input Control Circuitry

Each auto body is preferably transported by conveyor 14 through a preparation station and four paint spray stations, each station having a limit switch such as the one represented by reference numeral 18 in FIG. 4. The START signal produced by the limit switch at the job input station is passed to job input control circuitry 30 which is shown in detail in FIG. 5. More particularly, the START signal is passed to a flip-flop 31, having an output connected to an input terminal 32a of an AND gate 32. AND gate 32 also has input terminals 32b, 32c and 32d, coupled respectively, to terminals designated as job word 1, bit 5 and $t_1$.

AND gate 32 further has an output terminal 33 coupled to an input terminal of a flip-flop 34. The output of flip-flop 34 is simultaneously passed to an input terminal 35b of an AND gate 35 and an input terminal 38a of another AND gate 38. AND gate 35 further has a second input terminal 35a, coupled to a terminal designated as $t_2$, and an output terminal 36, coupled to an OR gate 37 at an input terminal thereof bearing the reference numeral 37a. A WRITE pulse is produced at the output terminal 38 of OR gate 37 in a manner explained in greater detail hereinafter.

AND gate 38 has additional input terminals 38b and 38c, coupled to terminals designated as job word 2 and $t_1$, respectively. An output terminal 39 of AND gate 38 is connected to a flip-flop 40 whose output is coupled to a second input terminal 37b of OR gate 37. The output of flip-flop 40 further produces a LATCH pulse which is passed to memory 100 for the purpose of transferring job input information prepared by the operator into the memory. The manner in which this occurs is further described in connection with the explanation of FIG. 9.

The output of flip-flop 40 is also passed to an input terminal 41a of an AND gate 41. AND gate 41 further includes input terminals 41b and 41c coupled, respectively, to terminals designated as $t_1$ and job word 1. The output terminal 42 of AND gate 41 is passed simultaneously through flip-flop 43 to a third input terminal 37c of OR gate 37 and to bit 5 of the input of memory 100 which is shown most clearly in FIG. 7.

C. Description of Signals Appearing at Terminals in the Control System Circuitry Throughout the description of FIG. 5, mention has been made of terminals designated as job word 1, bit 5, $t_1$, etc. The manner in which voltages are caused to appear at these terminals, and the purpose of these voltages are explained immediately hereinafter.

The job word 1 terminal passes a high voltage whenever memory 100, in moving through its 4096 word cycle, instantaneously reads one of the job word 1 addresses, i.e., any even numbered address in quadrant one between 0900 and 0931 of the job word set. At all other times, the job word 1 terminal passes a low voltage. In a similar manner, terminals designated as job word 2, style word 1, color word 2, etc., pass high voltages when the memory has advanced to one of the addresses corresponding to that particular word. The means for accomplsihing this result are generally described in connection with the explanation of FIG. 7.

The terminal designated as bit 5 passes a high voltage whenever a 1 appears in the fifth binary digit of any of the 4096, 18 bit words in memory 100. If a 1 does not appear in bit 5, a low voltage is passed. To achieve this result, bit 5 of memory 100, i.e., memory output terminal 102e (FIG. 7), is hard-wired to the terminal designated as bit 5. Similarly, any other terminal designated by a binary digit, such as a bit 1 terminal, a bit 2 terminal, etc., is hard-wired to the appropriate memory output terminal to pass high and low voltages as the 4096 words are cycled through the memory.

Figure 5:
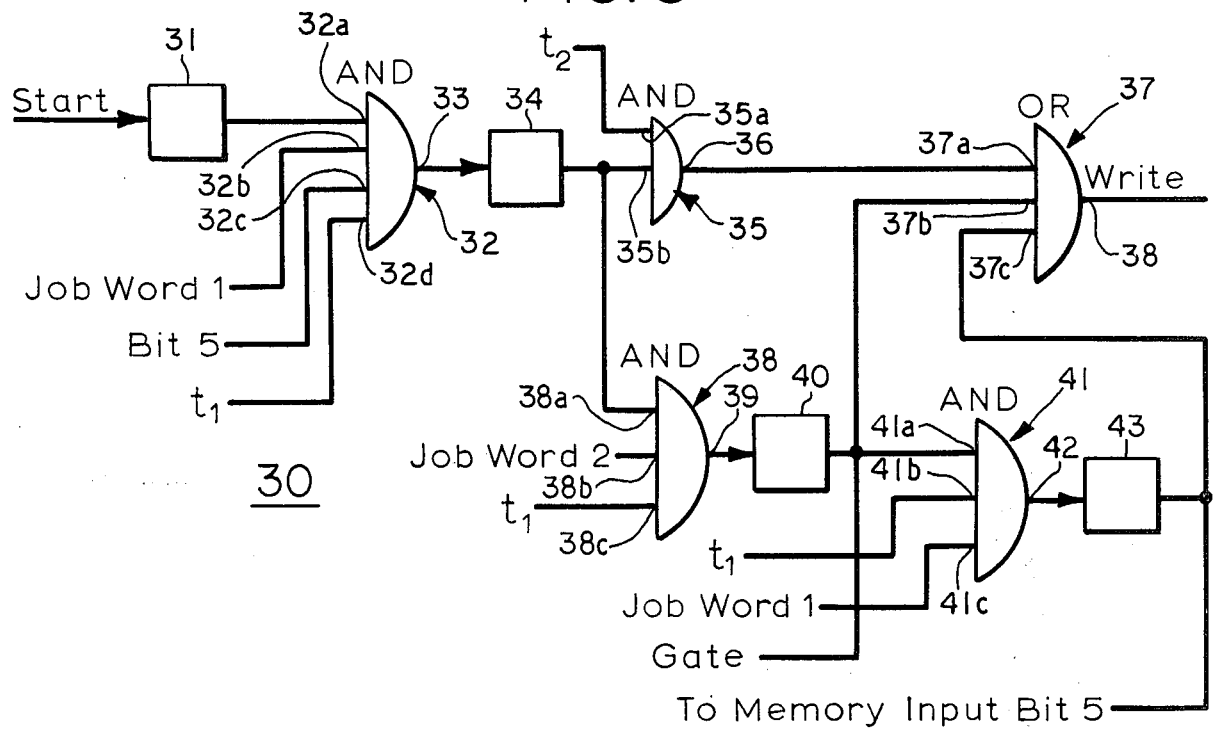
FIG. 5 is a circuit diagram, with various circuit elements represented in block form, of the job input station designated by block 30 in FIG. 3.
Figure 8:
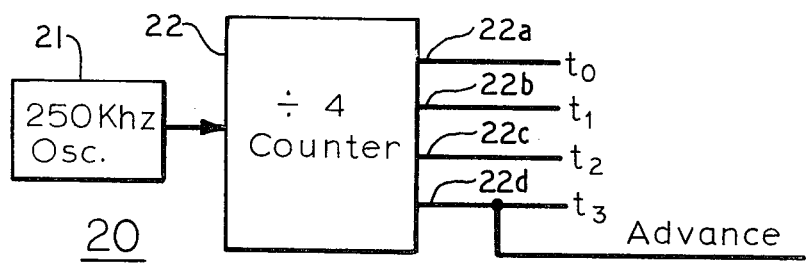
FIG. 8 is a more detailed block diagram of the clock represented by block 20 in FIG. 3.

As mentioned in connection with the explanation of FIG. 5, AND gate 32 has an input terminal designated as $t_1$. The generation of the signals applied to the terminal $t_1$ can be best explained by referring to FIG. 8. In particular, FIG. 8 represents clock 20, shown in block form in FIG. 3. Clock 20 includes a 250 kilohertz oscillator 21, producing a train of voltage pulses which are passed to a divide-by-four counter 22. Counter 22 has four output terminals 22a, 22b, 22c and 22d, connected to terminals designated as $t_0$, $t_1$, $t_2$ and $t_3$, respectively. Counter 22, in accordance with conventional practice, thus sequentially passes one voltage pulse to each of terminals $t_0$–$t_4$ for every four pulses generated by oscillator 21. Each pulse appearing at output terminal 22d of counter 22 is also passed to memory 100 in the form of an ADVANCE pulse, to continuously cycle the memory through all 4096 addresses.

D. Operation of Job Input Station Control Circuitry

Returning now to FIG. 5, the START pulse sets flip-flop 31, causing a high voltage to be passed to input terminal 32a of AND gate 32. The coincidence of a high voltage at input terminal 32a with high voltages passed from the terminals designated as job word 1 and $t_1$ to input terminals 32b, 32c and 32d, respectively, causes a high voltage to appear at output terminal 33 of AND gate 32. This coincidence indicates that an auto body has entered the job input station, that memory 100 has cycled to an address containing a job word 1, and in particular, an address with a 1 in bit 5 indicating that the next job word 2 is the address where the color and style information corresponding to the auto body now entering the job input station is to be deposited. Finally, the pulse from terminal $t_1$ indicates that counter 22 in FIG. 8 has counted two voltage pulses since the last ADVANCE pulse was passed to memory 100.

The high voltage at output terminal 33 of AND gate 32 is used to set flip-flop 34, thereby passing a high voltage to input terminal 35a of AND gate 35. When the next voltage pulse is counted by counter 22 (FIG. 8), causing a high voltage to appear at terminal $t_2$, a high voltage is passed from AND gate 35 to input terminal 37a of OR gate 37, causing a WRITE pulse to be passed to memory 100. The existence of a WRITE pulse permits data to be inputted into memory 100 at the particular address to which the memory has been advanced. Thus, the low voltage output of flip-flop 43, which is connected to bit 5 of the memory input, causes that bit to change from a 1 to a 0.

The high voltage from flip-flop 34 is also passed to input terminal 38a of AND gate 38. When memory 100 advances to the next job word 2, and counter 22 (FIG. 8) produces a high voltage at terminal $t_1$ (after having advanced the memory to the present job word 2 address), AND gate 38 sets flip-flop 40 which, in turn, sends a GATE pulse to a memory data gate 76 (FIG. 9) and also sends a WRITE pulse through OR gate 37 to the memory. Upon receipt of the Write pulse, a new job word 2, corresponding to the information most recently prepared by the operator, is inputted into the memory at its present address, thereby erasing the job word 2 originally stored there.

The output of flip-flop 40 is also passed to AND gate 41, which produces a high voltage at output terminal 42 when the memory advances to the next job word 1 and counter 22 in FIG. 8 passes a high voltage to terminal $t_1$. At that time, flip-flop 42 becomes set, causing a WRITE pulse to be passed to memory 100 through OR gate 37 and a 1 to be written into bit 5 of the memory. This, in effect, changes the job word 1 at the present address to indicate that the following job word 2 will correspond to the next address at which the next auto body data to enter the job input station is to be entered. Thus, when the next START pulse is passed from the limit switch in the job input station to flip-flop 31, job input control circuitry 30 will look for the new job word 1 address having a 1 in bit 5.

E. Description and Operation of the Job Input Circuitry

The job input 70 shown in FIG. 3 works in combination with job input station control 30 for the purpose of depositing job words 2 into memory 100 in the order in which they pass the operator. As explained hereinabove, the first two digits of these job words (which correspond to the first 8 binary bits) relate to the style code associated with the particular auto body passing the operator, and the next two decimal digits (corresponding to the next 8 binary bits) relate to the color code assigned to that auto body.

Figure 9:
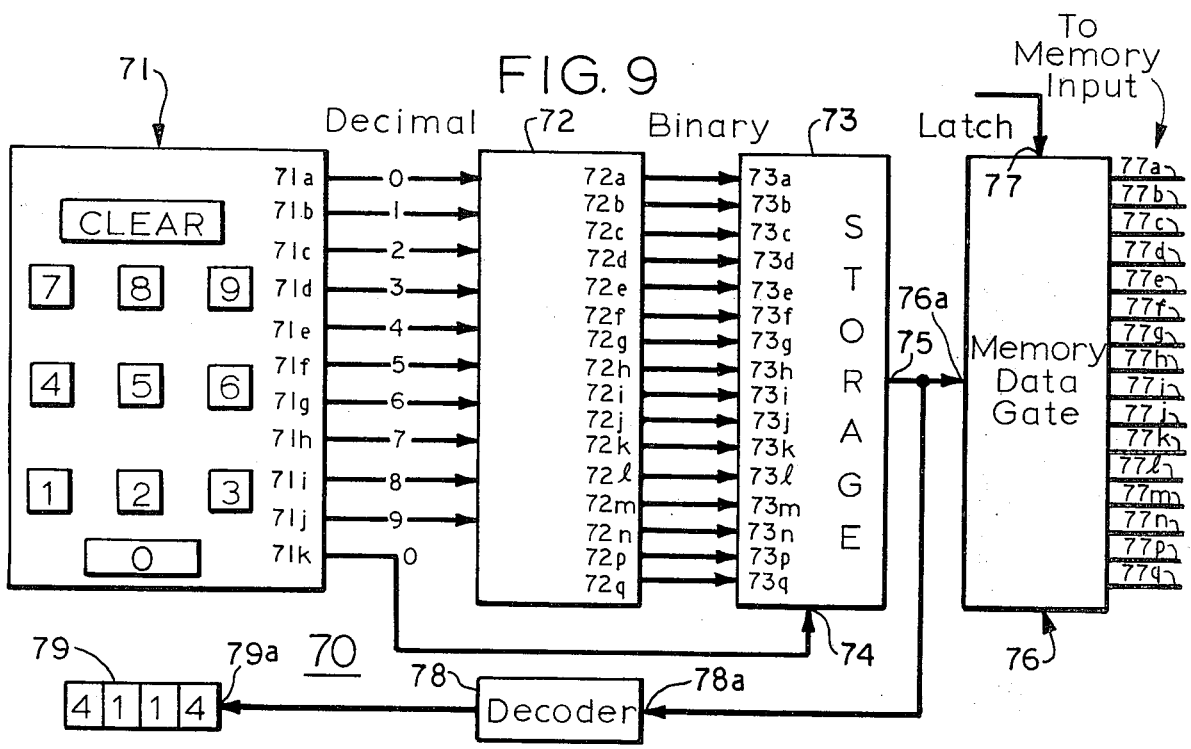
FIG. 9 is a front elevational view of a portion of the job input designated as block 70 in FIG. 3, further showing, in more detailed block form, the remainder of the elements comprising block 70.

As shown in FIG. 9, the job input 70 includes a keyboard 71 having keys corresponding to digits 0–9, as well as a "clear" key. Keyboard 71 further includes a plurality of output terminals 71a–71j which represent decimal numbers 0–9. Thus, whenever any key is depressed by the operator, a voltage signal appears at the corresponding output terminal. Output terminals 71a–71j are connected to a decimal-to-binary encoder 72 which receives the voltage signals from output terminals 71a–71j of keyboard 71.

Decimal-to-binary encoder 72 has a plurality of output terminals 72a–71q which represent the decimal numbers sequentially inputted by the operator at keyboard 71 as a 16 bit binary number. This 16 bit binary number is than latched into a storage register 73 through input terminals 73a–71q. Storage register 73 further includes a clear terminal 74, which is connected to an output terminal 71k of keyboard 71. Output terminal 71k corresponds to the clear key on keyboard 71, and passes a CLEAR signal to storage register 73 when the clear key is depressed. In this manner, the 16 bit binary word stored in storage register 73 can be erased by the operator if he discovers that an error has been made.

Storage register 73 also includes sixteen outputs represented schematically by a single terminal 75. Terminal 75 is used for passing the 16 bit binary word stored in the 16 outputs of register 73 for 16 respective inputs represented schematically by in input terminal 78a of a decoder 78. Decoder 78 converts the binary informtion received from storage register 73 into four groups of voltage signals adapted to energize a four decimal digit LED readout 79. These four groups of voltage signals are received at input 70a LED readout 79, and are promptly transferred into a digital representation of the number punched by the operator on keyboard 71. Thus, in the exemplary case of FIG. 9, if the four decimal digit word 4114 is punched out by the operator, the numbers 4114 will appear on LED readout 79.

As shown in FIG. 9, terminal 75 is also connected to 16 inputs represented schematically by a single terminal 76a of a memory data gate 76. Memory data gate 76 includes 16 output terminals 77a–77q, and a gate terminal 77. When a GATE pulse is received at gate terminal 77, memory date gate 76 causes the binary information received from storage register 73, to be inputted into memory 100 through output terminals 77a–77q which are connected to memory input terminals 101a–101q, respectively.

It should be remembered that the GATE pulse received at gate terminal 77 is produced only when memory 100 has advanced to the job word 2 which immediately follows the job word 0010. Job word 0010, as explained hereinbefore indicates that the next job word 2 is in the place where the color and style codes of the next auto body are to be written when the auto passes the job input station. Since the job word 0010 is then shifted to the next job word 1 address, however, the job word 2 most recently punched out by the operator— word 4114, for example—is deposited in a job word address now immediately preceding 0010. As a result, the job word 4114 is now properly last in line as shown by comparing the job word sets shown in FIGS. 1 and 2.

F. Description of Exemplary Spray Station Control Circuitry.

Figure 6:
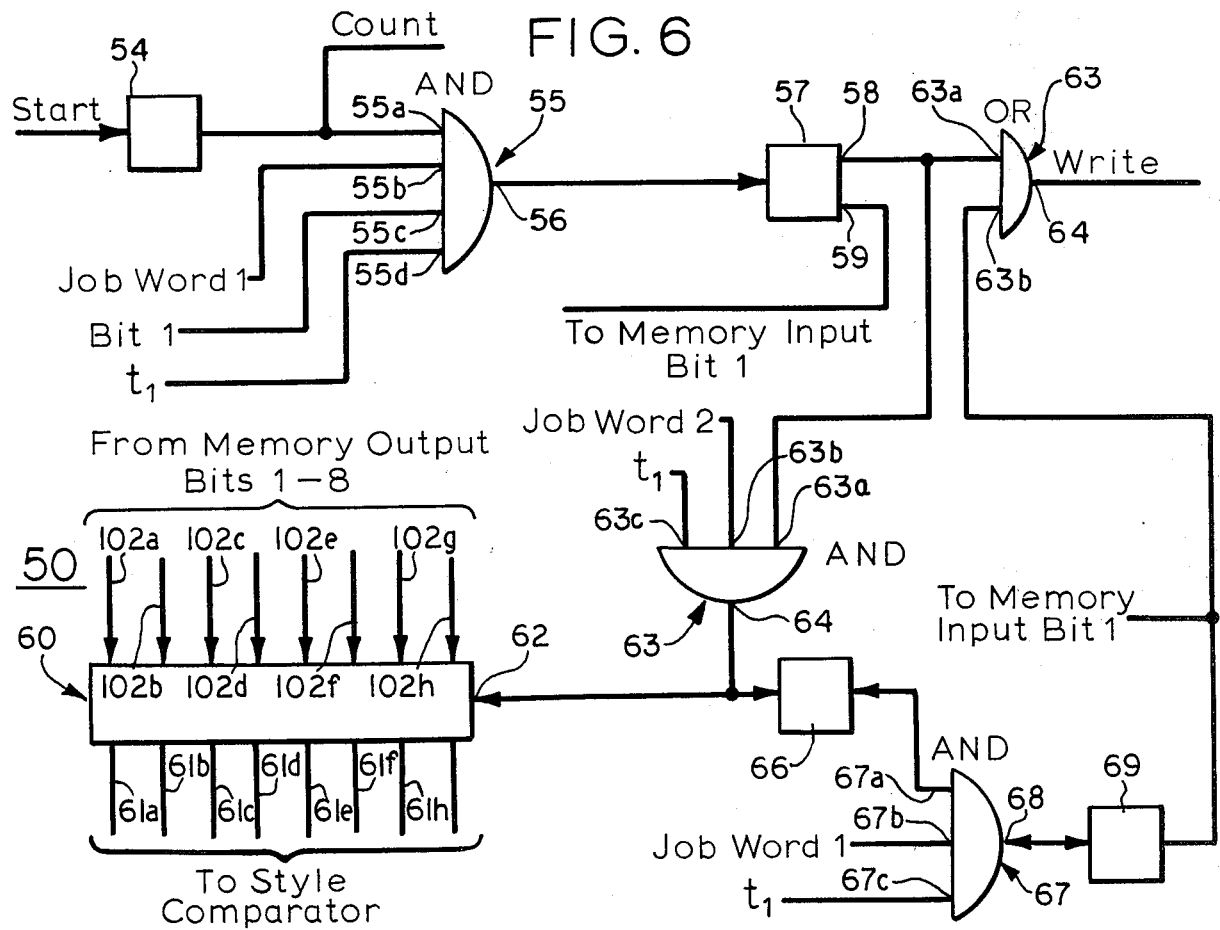
FIG. 6 is a circuit diagram, with various circuit elements represented in block form, of the station No. 1 designated by block 50 in FIG. 3.

Each of the spray station control circuits 50, 51, 52 and 53 shown in FIG. 3 contains circuitry similar to that of job input control circuitry 30. Station No. 1 circuitry 50, illustrated in FIG. 6, is typical and includes a flip-flop 54 which is set upon receipt of a START pulse from the limit switch in paint spray station No. 1. When flip-flop 54 is set, a COUNT pulse is generated which, along with the LOCATION pulses produced by pulser 13 (FIG. 4), is passed to an AND gate shown in FIG. 7 for the purpose of monitoring the distance along the conveyor which an auto body has traveled.

The output of flip-flop 54 is also connected to an input terminal 55a of an AND gate 55. AND gate 55 further includes input terminals 55b, 55c and 55d, coupled to the terminals designated as job word 1, bit 1 and $t_1$, respectively, and an output terminal 56. Output terminal 56 is coupled to another flip-flop 57 having a pair of output terminals 58 and 59, connected, respectively, to an input terminal 63a of an OR gate 63, and to bit 1 of the input to memory 100. OR gate 63 has an output terminal 64 connected to memory 100 for passing a WRITE pulse thereto.

Output terminal 58 of flip-flop 57 is also connected to an input terminal 63a of an AND gate 63. AND gate 63 further includes input terminals 63b and 63c connected, respectively, to terminals designated as job word 2 and $t_1$, and output terminal 64. Output terminal 64 is jointly coupled to an accept terminal 62 of a style register 60 and another flip-flop 66 having an output connected to an input terminal 67a of an AND gate 67. Terminals designated as job word 1 and $t_1$ are connected, respectively, to additional input terminals 67b and 67c of AND gate 67. An output terminal 68 of AND gate 67 is connected to a flip-flop 69, having an output jointly coupled to bit 1 of the input to memory 100 and another input terminal 63b of OR gate 63.

G. Operation of Exemplary Spray Station Control Circuitry

In accordance with the operation of the paint spray control system of the invention as hereinabove described, the limit switch in a typical spray station shown in FIG. 4, generates a START pulse when an auto body enters the station. This START pulse sets flip-flop 54 which passes a high voltage to input terminal 55a of AND gate 55. When memory 100 is at a job word 1 address, having a 1 in bit 1, (job word 0001), and when counter 22 of FIG. 8 causes a high voltage to appear at $t_1$, AND gate 55 produces a high voltage at output terminal 56, thereby setting flip-flop 57.

When flip-flop 57 is set, output terminal 58 passes a high voltage, and output terminal 59 passes a low voltage in a conventional manner. The high voltage from output terminal 58 is passed to OR gate 63 to produce a WRITE which permits data to be inputted into memory 100. Since output terminal 59 is connected to bit 1 of the input of the memory, and passes a low voltage when a WRITE pulse is produced, bit 1 of the job word 1 presently addressed in memory 100 is changed from a 1 to a 0. Thus, the job word 1 in the memory is changed from 0001 to 0000.

Figure 7:
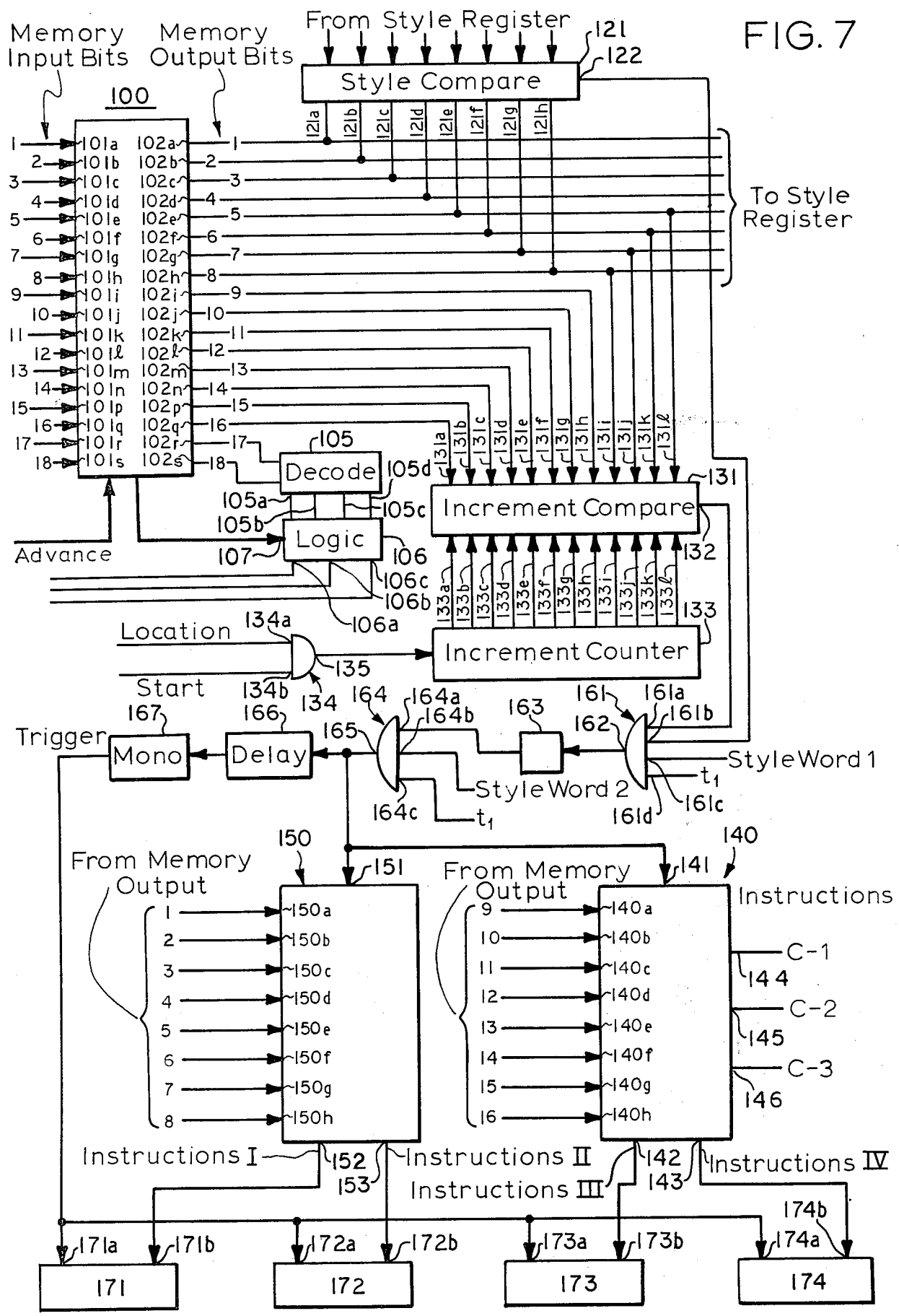
FIG. 7 is a circuit diagram, with various circuit elements represented in block form, of blocks 100, 120, 140, 130, 180 and 181 shown in FIG. 3.

The high voltage at output terminal 58 is also passed to AND gate 63, and when memory 100 is advanced to the next job word 2 address, and counter 22 in FIG. 8 produces a high voltage at $t_1$, a high voltage is passed to accept terminal 62 of style register 60. Style register 60 has eight input terminals which are coupled to memory output terminals 102a–102h of memory 100. As shown in FIG. 7, these eight terminals carry binary information corresdonding to the first 8 bits of whatever word is presently at the output of memory 100. When a high voltage is received at accept terminal 62 of style register 60, the first eight bits contained in the present address of the memory are latched through terminals 102a–102h into register 60. Accept terminal 62, however, receives a high voltage from AND gate 63 only when the job word 2 immediately following job word 1001 appears at the output of memory 100. For reasons explained hereinbefore, this job word 2 contains style information corresponding to the auto body about to pass through spray station No. 1. This style information is stored at a plurality of output terminals 61a–61h in style registor 60, and at the proper time, is compared with other style information at a style comparator shown in FIG. 7.

The high output voltage from AND gate 63 is also used to set flip-flop 67 which, when set, delivers a high voltage to input terminal 67a of AND gate 67. When this high voltage coincides with the advancement of memory 100 to the next job word 1, and the production of a high voltage at terminal $t_1$, a high voltage is passed through AND gate 68 to flip-flop 69. This high voltage sets flip-flop 69, causing a high voltage to be passed through OR gate 63, in the form of a WRITE pulse, to memory 100. Simultaneously, the high voltage is passed to bit 1 of the input of memory 100, changing bit 1 to a 1. Thus, when the next START pulse is received at flip-flop 54, AND gate 55 will respond to this particular job word 1, and the next following word 2 will be stored in style register 60.

H. Description of Style and Increment Circuitry

The style and increment portions of the paint control system can now be explained by referring to FIG. 7. In particular, an AND gate 134, is adapted to receive a LOCATION pulse and a START pulse at a pair of input terminals 134a and 134b, respectively. An output terminal 135 of AND gate 134 is connected to an increment counter 133 having 12 output terminals 133a–133l. Output terminals 133a–133l are coupled to an increment comparator 131 which has twelve input terminals 131a–131l. Similarly, a style comparator 121 has eight input terminals 121a–121h. Input terminals 131a–131l of increment comparators 131 are connected to memory output terminals 1023–102q which pass bits 5–16 from the output of memory 100. Input terminals 121a–121h, on the other hand, are connected to memory output terminals 102a–102h which pass bits 1–8 from the output of memory 100.

Memory 100 further includes memory output terminals 102r and 102s which pass bits 17 and 18 of the words stored in memory 100. Output terminals 102r and 102s are connected to a decoder 105 which receives bits 17 and 18 and determines whether they define a style word, job word, recognition word or color word. Decoder 105 includes four output terminals 105a–105d which are connected to a logic circuit 106. Logic circuit 106 has an input terminal 107 connected to memory 100 for receiving information as to whether the words continuously cycled through the memory are at an odd or even address. At the output of logic circuit 106 are a plurality of output terminals, three of which are shown as 106a–106c. These output terminals correspond to terminals designated as job word 1, job word 2, style word 1, etc. Thus, through means of decoder 105 and logic circuit 106, output terminal 106a displays a high voltage when memory 100 is instantaneously addressed at a job word 1, output terminal 106b diplays a high voltage when memory 100 is instantaneously addressed at a job word 2, etc.

Still referring to the detailed description of FIG. 7, increment comparator 131 has a compare terminal 132, and style comparator 121 has a compare terminal 122 coupled, respectively, to input terminals 161a and 161b of an AND gate 161. AND gate 161 further includes an input terminal 161c connected to the terminal designated as style word 1, an input terminal 161d connected to the terminal designated as $t_1$, and an output terminal 162 connected to a flip-flop 163. The output of flip-flop 163, the style word 2 terminal and the $t_1$ terminal are coupled, respectively, to input terminals 164a, 164b and 164c of another AND gate 164.

An output terminal 165 of AND gate 164 is jointly coupled through a gating terminal 151 to a first decoder 150, and through a gating terminal 141 to a second decoder 140. Decoder 150 also has a plurality of input terminals 150a–150h connected, respectively, to memory output terminals 102a–102h, and adapted to receive bits 1–8 of the words continuously appearing at the output of memory 100. Similarly, decoder 140 has a plurality of input terminals 140a–140h, connected, respectively, to memory output terminals 102i–102q, and adapted to receive bits 9–16 of the words continuously appearing at the output of memory 100. Decoders 150 and 140 each have two sets of 12 instruction terminals, each set being designated by the reference numerals 152 and 153, 142 and 143, respectively. The set of instruction terminals shown as 152 is hard-wired through a set of input terminals 171b to a style operation circuit 171 which contains various motors, solenoids and the like for positioning and actuating the paint sprayers, nozzles, etc. Similarly, the sets of instruction terminals designated as 153, 142 and 143 are hard-wired through respective sets of input terminals 172b, 173b and 174b to respective style operation circuits 172, 173 and 174. Decoder 140 additionally includes three other instruction terminals designated by the reference numerals 144, 145 and 146.

The output of AND gate 164 is also coupled through a delay circuit 166, to a monostable multi-vibrator 167. Monostable multi-vibrator 167 is, in turn, jointly connected to input terminals 171a, 172a, 173a and 174a of style operation circuits 171, 172, 173 and 174, respectively. As explained hereinafter, the coincidence of high voltages at each pair of input terminals of each style operation circuit causes the energization of the solenoids and motors contained therein.

I. Operation of the Style and Increment Circuitry

The operation of the style and increment circuitry shown in FIG. 7 can now be explained. As described hereinabove, when an auto body enters a paint spray station, as shown in FIG. 4, for example, a START pulse from the limit switch 18 and a train of LOCATION pulses from pulser 13 are passed to gate 134 in FIG. 7. Accordingly, at output terminal 135 of gate 134 there appears a series of voltage pulses (corresponding to those generated by pulser 18) which indicates the distance through the spray station that the auto body has traveled. Pulser 18 is timed with the speed of conveyor 14 so that one pulse is generated for each inch of movement thereof.

The pulses appearing at output terminal 135 of gate 134 are passed to increment counter 133 which represents in binary form at output terminals 133a–133l, the number of pulses received. At the same time, memory 100 cycles through the 4096 words stored therein, including those stored in the sytle word set. As explained in connection with the preceeding discussion of the memory, bits 5–16 of the style word set contain increment information, i.e., data corresponding to the distance in inches in which an auto body has traveled through a spray station. Bits 5–16 are continuously being latched through memory output terminals 102e–102s into input terminals 131a–131l of increment comparator 131. When the increment information of the style word instantaneously represented at the output of memory 100 matches the number registered by increment counter 133, increment comparator 131 produces an INCREMENT COMPARE pulse at compare terminal 132 and passes it to input terminal 161a of AND gate 161.

Style comparator 121 operates in essentially the same manner as increment comparator 131. More particularly, as explained in connection with the description of FIG. 6, style registor 60 stores the style code contained in the job word 2 immediately following the job word 0001. This style code thus corresponds to the style of the auto body passing through spray station No. 1, and is latched into style comparator 121 in a conventional manner. As memory 100 cycles through the 4096 words stored therein, bits 1–8 of each of these words are continuously passed from memory output terminals 102a–102h into input terminals 121a–121h of style comparator 121. When the style information in a style word 1 stored in memory 100 corresponds to the style code stored in style register 60, however, a STYLE COMPARE pulse is produced at compare terminal 122 of style comparator 121 and passed to input terminal 161b of AND gate 161.

The coincidence of a STYLE COMPARE pulse and an INCREMENT COMPARE pulse at AND gate 161, along with the simultaneous receipt of high voltages applied to input terminals 161c and 161d from terminals designated as style word 1 and $t_1$, respectively, causes a high voltage to appear at output terminal 162. A high voltage at output terminal 162 is of great significance because it indicates that memory 100 is currently displaying, at its output, a style word 1 having style information that matches the style of the auto body presently in the spray station, and increment information corresponding to the instantaneous location in the spray station of that particular auto body.

The high voltage at output terminal 162 of AND gate 161 sets flip-flop 163 which, in turn, passes a high voltage to input terminal 164a of AND gate 164. When memory 100 has cycled to the next address, which is a style word 2 containing a coded instruction corresponding to the previous style word 1, and counter 22 of FIG. 8 produces the next high voltage at terminal $t_1$, AND gate 164 will produce a high voltage at output terminal 165. This voltage, after passing through a delay circuit 166 to allow for the dissipation of transients and other spurious signals, sets monostable multi-vibrator 167 in a conventional manner. When set, monostable multi-vibrator 167 produces a TRIGGER signal which is passed to style operation circuits 171, 172, 173 and 174, causing them to latch and store the instruction signals from decoders 150 or 140.

The high voltage at output terminal 165 of AND gate 164 is also passed to gating terminals 151 and 141 of decoders 150 and 140, respectively. This causes bits 1–8 of the presently displayed style word 2 to be latched from memory output terminals 102a–102h into input terminals 150a–150h of decoder 150. Similarly bits 9–16 of the same style word 2 are gated from memory output terminals 102i–102q into input terminals 140a–140h of decoder 140. Decoders 150 and 140 contain circuitry for decoding the binary information associated with bits 1–16 of style word 2 into instruction signals which are hard-wired to style operation circuits 171, 172, 173 and 174. In the preferred embodiment, insturction signals I, II, III and IV are passed to style operation circuits 171, 172, 173 and 174, respectively. These instruction signals may, for example, position top paint spray nozzle 16, or actuate side paint spray nozzle 17 shown in FIG. 4. Decoder 140 further produces a plurality of color instructions C-1, C-2 and C-3 whose purpose and function are explained in the following description of FIG. 11.

J. Description of Color Circuitry

Figure 11:
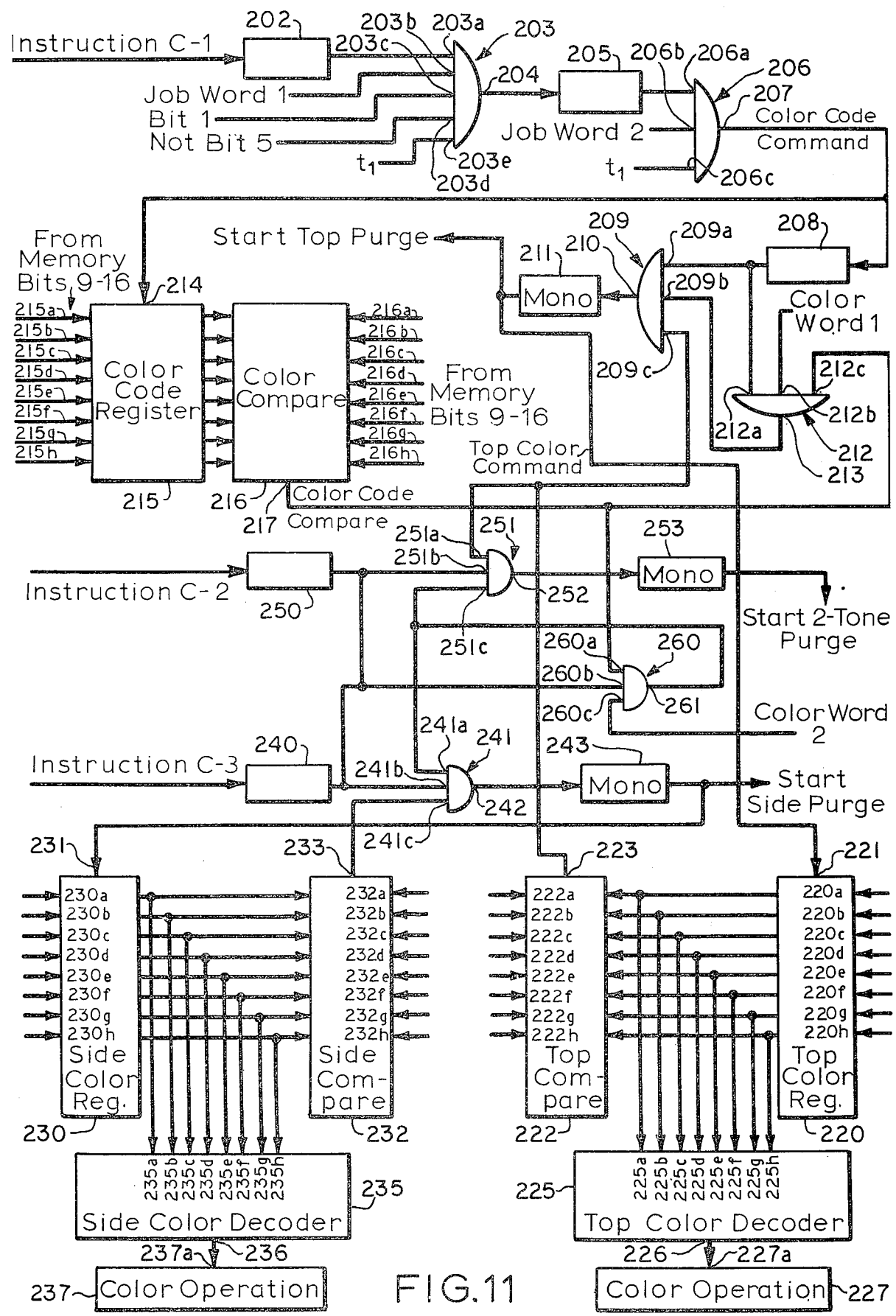
FIG. 11 is a circuit diagram, with various circuit elements represented in block form, representing blocks 200 and 201 shown in FIG. 3.

In FIG. 11, the color instruction C-1 is received at a flip-flop 202 having an output connected to an input terminal 203a of an AND gate 203. AND gate 203 further includes input terminals 203b, 203c, 203d and 203e, connected to terminals designated as job word 1, bit 1, NOT bit 5 and $t_1$, respectively, and an output terminal 204. Output terminal 204 is connected to a flip-flop 205 which is, in turn, connected to an input terminal 206a of another AND gate 206. Terminals designated as job word 2 and $t_1$ are respectively connected to input terminals 206b and 206c of AND gate 206. An output terminal 207 of AND gate 206 is jointly connected to a COMMAND terminal 214 of a color code register 215, and a flip-flop 208.

Color code register 215 has a plurality of input terminals 215a–215h, connected, respectively, to memory output terminals 102i–102q. At an appropriate time, the information passed to input terminals 215a–215h is presented at the input to a color code comparator 216. Color code comparator 216 has a color compare terminal 217, and a plurality of input terminals 216a–216h which are also connected to memory output terminals 102i–102q, respectively.

Color code compare terminal 217 is connected to an input terminal 212c of an AND gate 212, which also has an input terminal 212a connected to the output of flip-flop 208, and an input terminal 212b connected to a terminal designated as color word 1. An output terminal 213 of AND gate 212 is connected to an input terminal 209b of an AND gate 209. AND gate 209 further has an input terminal 209a which is also connected to the output of flip-flop 208, and an input terminal 209c which is connected to a top compare terminal 223 of a top comparator 222. AND gate 209 has an output terminal 210 which is coupled through a monostable multi-vibrator 211 to top purge circuitry (not shown). The output of monostable multi-vibrator 211 also sends a TOP COMMAND signal to a command terminal 221 of a top color register 220.

Top color register 220 has a plurality of input terminals 220a–220h connected to memory output terminals 102a–102h. At an appropriate time, the information appearing at input terminals 220a–220h of top color register 220 is latched into color register 220 and presented at one set of inputs of top comparator 222, which has a plurality of input terminals 222a–222h also connected to memory output terminals 102a–102h. The information at input terminal 220a–220l of top color register 220 are also presented at a plurality of input terminals 225a–225h, respectively, of a top decoder 225. Top decoder 225 has an output terminal 226 connected to an input terminal 227a of a color operation circuit 227.

Another color operation circuit 237, having an input terminal 237a, is adapted to receive a signal from an output terminal 236 of a side decoder 235. Side decoder 235 has a plurality of input terminals 235a–235h, adapted to receive information latched into a corresponding plurality of input terminals 230a–230h of a side register 230. Input terminals 230a–230h of side register 230 are respectively connected to memory output terminals 102a–102h, and are further adapted to present the information appearing thereat to a side comparator 232. Side comparator 232 also has a plurality of input terminals connected to memory output terminals 102a–102h, and a side compare terminal 233.

Side compare terminal 233 is connected to an input terminal 241c of an AND gate 241. AND gate 241 also has an input terminal 241a, and an input terminal 241b, coupled to a flip-flop 240 which is adapted to receive color instruction C-3. An output terminal 242 of AND gate 241 is coupled through a monostable multi-vibrator 243 to side purge circuitry (not shown). The output of monostable multi-vibrator 243 is also adapted to produce a SIDE command signal which is passed to a command terminal 231 of side register 230.

Instruction C-2 is passed to a flip-flop 250 whose output is jointly coupled to input terminal 241b of AND gate 241, and an input terminal 251b of an AND gate 251. And gate 251 has an output terminal 252, coupled through a monostable multi-vibrator 253, to two-tone purge circuitry (not shown). AND gate 251 further includes an input terminal 251a connected to top compare terminal 223 of top comparator 222, and an input terminal 251c coupled to an output terminal 261 of an AND gate 260. Output terminal 261 of AND gate 260 is also coupled to input terminal 241a of AND gate 241. AND gate 260 also has three input terminals 260a, 260b, and 260c connected, respectively, to color compare terminal 217 of color code comparator 216, input terminals 251b and 241b of AND gates 251 and 241, respectively, and the terminal designated as color word 2.

K. Operation of Color Control Circuitry

The operation of the color control circuitry shown in FIG. 11 is primarily the same for top, side and two-tone color operations. In general, the color control circuitry must compare the color being employed in a particular spray station with the color to be applied to the next auto body to enter that station. If the colors are different, a signal must be generated to clean or purge the spray nozzles and supply lines of the existing paint, and activate means for connecting the nozzles to the paint supply lines corresponding to the proper paint color.

As indicated in connection with the description of FIG. 7, instructions C-1, C-2 and C-3 are generated upon command from decoding circuit 150. Instruction C-1 sets flip-flop 202 which then passes a high voltage to input terminal 203a of AND gate 203. Upon simultaneously receiving high voltages from terminals designated job word 1, bit 1, NOT bit 5 and $t_1$, AND gate 203 produces a high voltage at output terminal 204. This high voltage, which indicates that the continuously cycling memory 100 is presently at address 0001 in the job word set, is used to set flip-flop 205.

When flip-flop 205 is set, a high voltage is passed to input terminal 206a of AND gate 206. When memory 100 cycles to its next job word 2 address, and counter 22 in FIG. 8 produces a high voltage at terminal $t_1$, AND gate 206 produces a COLOR COMMAND signal at output terminal 207. This COLOR COMMAND signal sets flip-flop 208, and is passed to command terminal 214 of color register 215, causing the information in bits 9–16 rerpresented at memory output terminals 102h–102q to be latched into input terminals 215a–215h. Since this occurs when the job word 2 following the job word 0001 is represented by memory 100, bits 9–16 contain the color code corresponding to the next auto body to enter spray station No. 1. This color code then appears at one input of color comparator 216.

As memory 100 continues to cycle through the 4096 words stored therein, a color word 1, which contains color information pertaining to the top of the auto body, appears at the memory output terminals. The color code information appears at the input to color code comparator 216 through input terminals 216a–216h, and if it compares with the job word 2 color code information passed from color code register 215, a COMPARE pulse is produced at output terminal 217.

At the coincidence of a high voltage at the output of flip-flop 208 (caused by the existence of the COLOR COMMAND pulse from AND gate 206), a high voltage from the color word 1 terminal indicating that the memory output terminals are displaying color information pertaining to the top of the auto body, and a COLOR CODE COMPARE signal from color code comparator 216, AND gate 212 displays a high voltage at output terminal 213. If this high voltage is received at AND gate 209 simultaneously with a high voltage from the output of flip-flop 208, and a TOP COMPARE pulse from top comparator 222, a high voltage appears at output terminal 210. As explained hereinafter, the existence of a TOP COMPARE pulse from top comparator 222, indicates that the paint color being applied to the top of the auto body presently in station No. 1, and the paint color called for the top of the auto body which is the next to enter station No. 1, are not the same. This high voltage at output terminal 210 of AND gate 209 is passed through monostable multi-vibrator 211 to energize top purge circuitry (not shown). As explained hereinbefore, top purge circuitry causes the cleansing of the paint supply lines so that the new color called for when the next auto body enters station No. 1 does not contain remnants of the color presently used.

At the output of monostable multi-vibrator 211 there is also produced a TOP COMMAND pulse which is passed to command terminal 221 of top register 220.

Upon receipt of this TOP COMMAND signal, the color word 1 presently appearing at the memory output terminals are latched into top register 220 through input terminals 220a–220h. It should be remembered that this color word 1 contains the color information corresponding to the color code of the job wod 2 which defines the next auto body to enter spray station No. 1. This color information appears at the input to top comparator 222 and to top decoder 225 through input terminals 225a–225h. Top decoder 225, upon receipt of the color information from top register 220, produces color instructions which are hard-wired color operation circuitry 227. As explained hereinbefore, color operation circuitry 227 operates means for connecting the top paint supply lines to the paint supply corresponding to the color defined by the color word 1 represented at the memory output terminals.

As explained hereinbefore, input terminals 222a–222h of top comparator 222 are coupled to memory output terminals 102i–102q. Accordingly, the information contained in bits 9–16 of the memory is continuously being presented at the input to top comparator 22 as memory 100 cycles through the 4096 words stored therein. When the job word 2 following the word 0001 is cycled through the memory, it is, as a matter of course, also appears at the input to the top comparator. If the color information in this job word 2 matches the information stored in top register 220, indicating that the color of the top of the next auto body to enter spray station No. 1 is the same as the color of the top of the auto body presently being painted, no TOP COMPARE pulse will appear at compare terminal 223. As a result, AND gate 209 will not produce a high voltage at output terminal 210, and the top purge circuitry will not be energized. If, however, the color information in the job word 2 following job word 0001 does not match the information stored in top register 220, a TOP COMPARE pulse will be produced, thereby causing the top purge circuitry to be activated.

The side and two-tone color circuitry of FIG. 11 operates in essentially the same manner as the top color circuitry just explained. Thus, upon coincidence of color instruction C-3, a COLOR CODE COMPARE pulse from color code comparator 216, and a high voltage at the terminal designated as color word 2, a high voltage will appear at output terminal 261 of AND gate 260. This high voltage at output terminal 261, color instruction pulse C-3, and a SIDE COMPARE pulse from side comparator 232 (indicating that the side color presently used in spray station No. 1 differs from the side color called for the next auto body), causes a high voltage to appear at output terminal 242 of AND gate 241. This high voltage is passed through monostable multi-vibrator 243 to energize the side purge circuitry.

Similarly, when color instruction pulse C-2, the TOP COMPARE pulse from top comparator 223, and the high voltage at output terminal 261 of AND gate 260 are received at AND gate 251, a high voltage appears at output terminal 252. This high voltage is passed through monostable multi-vibrator 253 to energize the two-tone purge circuitry in the same manner in which the top and side purge circuitry are energized.

L. Description and Operation of Data Input Circuitry

Data input circuitry 90 is used to load the style, recognition and color words into the memory. However, unlike the job words, which are constantly being deposited, shifted and erased, style recognition and color words contain preprogrammed information and are therefore stored indefinitely. To deposit a particular style, recognition or color word into memory 100, a WRITE pulse must be applied thereto. So that the data deposited into the memory is inputted at the proper address, the WRITE pulse must occur when the memory has cycled to that particular address. This is done by producing a COMPARE pulse in the manner described immediately hereinafter.

Figure 10:
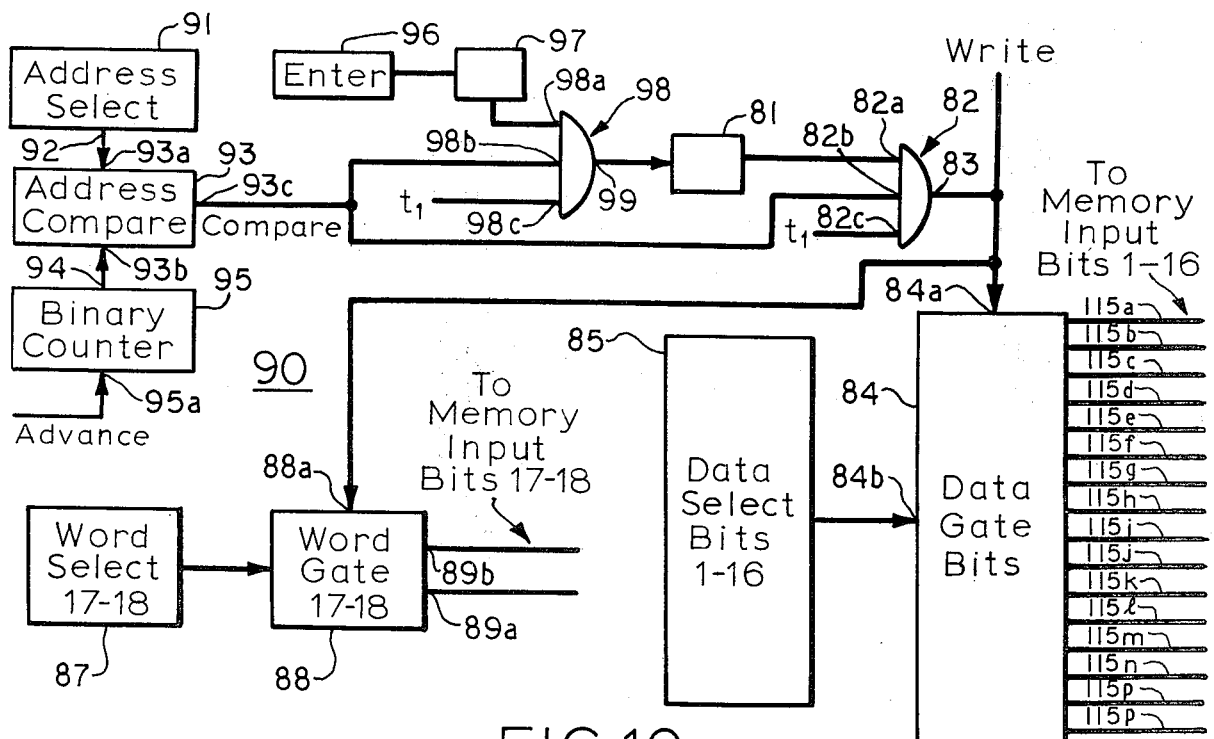
FIG. 10 is a circuit diagram, with various circuit elements represented in block form, showing the data input represented by block 90 in FIG. 3.

As shown in FIG. 8, each time a high voltage appears at terminal $t_3$, an ADVANCE pulse is simultaneously produced. Though, as explained hereinbefore, this ADVANCE pulse is used to cycle memory 100 through the 4096 words stored therein, it is also applied to advance terminal 95a of a binary counter 95 which is shown in FIG. 10. Binary counter 95 further includes an output 94 which passes binary information corresponding to the instantaneous numerical address of memory 100 to an input terminal 93b of an address comparator 93. Address select circuitry 91 contains means for producing a binary number corresponding to any one of the 4096 addresses in the memory. This binary number is passed through an output 92 to another input terminal 93a of address comparator 93. When the instantaneous address of memory 100 corresponds to the address selected by address select circuitry 91, address comparator 93 produces the COMPARE pulse at an output terminal 93c.

When the operator desires to enter a particular word, he depresses a data button 96 which sets a flip-flop 97. Upon coincidence of a high voltage at the output of flip-flop 97, the COMPARE pulse from address comparator 93, and a high voltage at terminal $t_1$, at respective input terminals 98a, 98b and 98c of AND gate 98, a high voltage appears at an output terminal 99. This high voltage is passed from output terminal 99 of AND gate 98 to a flip-flop 81 which then produces a high voltage at its output. The simultaneous receipt of the high voltage from the output of flip-flop 81, the COMPARE pulse, and a high voltage at terminal $t_1$, at input terminals 82a, 82b and 82c of an AND gate 82, causes a WRITE pulse to appear at output terminal 83. This WRITE pulse is passed to memory 100, and occurs when the memory is at the address selected by address select circuitry 91. Accordingly, memory 100 is now prepared to receive a style, recognition or color word at the address desired.

The 18 bits comprising each style, recognition and color word are produced by means of word select circuitry 87 and data select circuitry 85. More particularly, word select circuitry is adapted to produce bits 17 and 18 which designate which set a word belongs to in a manner hereinbefore described. Thus, if a style word is to be stored in the memory, bits 17 and 18 should each contain a 1, and therefore the word 11 is selected by the operator of word select circuitry 87. Word select circuitry 87 is connected to a word gate 88 which is adapted to receive the information selected at word select circuitry 87. Word gate 88 includes a pair of output terminals 88a and 88b, connected to memory input terminals 101r and 101s. It will be remembered that terminals 101r and 101s correspond to bits 17 and 18 of each word stored in memory 100. Word gate 88 further includes an enter terminal 88a which is connected to output terminal 83 of AND gate 82 and adapted to receive the WRITE pulse therefrom. Upon receipt of the WRITE pulse at enter terminal 88a, the information stored at terminals 89a and 89b of word gate 88 are deposited into memory 100 through memory input terminals 101r and 101s. Since the WRITE pulse is only produced when the memory is at the address selected by address select circuitry 91, the data from word gate 88 is deposited into memory 100 at the address desired.

Data select circuitry 85 operates similarly to word select circuitry 87 except information corresponding to bits 1–16 instead of bits 17 and 18 is deposited in memory 100. More particularly, the operator selects 16 bits of desired information which are passed to an input 84b of a data gate 84. Data gate 84 further includes an enter terminal 84a and a plurality of output terminals 115a–115q. Output terminals 115a–115q are connected to memory input terminals 101a–101q and are adapted to pass thereto the 16 bits of information received at input 84b from data select circuitry 85. Enter terminal 84a is connected to output terminal 83 of AND gate 82 and, upon receipt of the WRITE pulse therefrom, causes the 16 bits of information at data gate 84 to be deposited into memory 100. Since, as explained hereinabove, the WRITE pulse is produced only when the memory is at the address selected by address select circuitry 91, the 16 bits of information selected at data select circuitry 85 are deposited into memory 100 at the desired address.

M. Conclusion

The operation and description of each basic part of the paint control system of the invention have now been fully explained. From the foregoing it should be apparent that this paint control system includes a preprogrammable memory which permits objects of varying shapes and sizes to be painted automatically. The control system further provides many other features and advantages which will be recognized by those skilled in the art.

Without departing from the true scope of the invention, those skilled in the art may also make numerous changes in the circuitry herein described, or develop embodiments other than the exemplary embodiment herein disclosed. Though all such changes and embodiments cannot be foreseen, they are intended to be covered by the accompanying claims.

We claim:

1. A paint spray control system, for controlling a paint spray apparatus including a paint spray station having at least one spray gun and conveyor means for transporting objects of diverse styles past said spray gun, comprising:
    advanceable memory means;
    input means for depositing into said memory means a first set of data words, some of said data words in said first set representing the position of an object of predetermined style relative to said spray station, a second set of data words, one of said data words in said second set being representative of the style of one of said objects transported by said conveyor means, and at least one code word identifying which one of said objects on said conveyor means is next to enter said spray station;
    style means, coupled to said memory means, for storing style information from the one of said second set of data words identified by said code word;
    location indicating means for instantaneously representing the position of one of said objects transported by said conveyor means relative to said spray station; and comparison means, coupled to said register means, said location indicating means, and said memory means, for producing an energization signal after said memory means have advanced to the data word in said first set representing the position of an object corresponding to that represented by said location indicating means, and the style of an object corresponding to that stored in said style means.

2. The control system set forth in claim 1 further includes operation means, responsive to said energization signal, for positioning and actuating said spray gun.

3. The control system set forth in claim 1 wherein said input means include a data input for depositing said first set of data words, and a job input for depositing said second set of data words.

4. The control system set forth in claim 1 wherein said location indicating means include a pulser, initiating the production of a train of voltage pulses when an object to be painted enters said spray station, and an increment counter, adapted to receive and count said voltage pulses.

5. The control system set forth in claim 4 wherein said comparison means include an increment comparator coupled between said increment counter and said memory means to compare the position of said object to be painted relative to said spray station with the position of said object of predetermined style denoted by some of said data words in said first set.

6. The control system set forth in claim 1 wherein said comparison means further include a style comparator coupled between said register means and said memory to compare the style of an object to be painted with said object of predetermined style denoted by some of said data words in said first set.

7. The control system set forth in claim 1 further includes clocking means for advancing said memory means through a plurality of addresses, and wherein said first set of data words includes alternately addressed information words and instruction words, said information words serving as a means for locating said instruction words.

8. The control system set forth in claim 1 wherein said input means are adapted to deposit into said memory a third set of data words representing paint colors applicable to said objects transported by said conveyor means, and wherein said control system further includes a color register, coupled to said memory means, for storing the data word in said third set representing the color to be applied to one of said objects transported by said conveyor means.

9. The control system set forth in claim 8 further includes a color comparator, coupled between said color register and said memory for producing a purge signal causing said spray gun to be purged of paint if the color represented by said color register differs from the color instantaneously represented by the memory.

10. The control system set forth in claim 9 further includes a plurality of supply lines coupled to said spray gun adapted to pass different colored paint thereto, and color operation means, coupled between said color register and said color supply lines for connecting said spray gun to the supply line having the paint color corresponding to the paint color associated with the data word in the third set instantaneously addressed in said memory means.

11. A paint spray control system for controlling a paint spray apparatus including a paint spray station having at least one spray gun and conveyor means for transporting objects of diverse styles past said spray gun, comprising:

an advanceable memory;

a data input for depositing in said memory a set of style words and a set of color words, some of said style words having a position portion representing the position of an object relative to said spray station, and a style portion representing a predetermined style of an object which can be transported by said conveyor, and said color words representing paint colors applicable to said objects transported by said conveyor; and for depositing in said memory a set of code words one of which identifies which of said objects on said conveyor means is the next to enter said spray station;

a job input for depositing in said memory a set of job words, one of said job words being representative of both the style of an object transported by said conveyor and the color to be applied to said object;

a style register, coupled to said memory, for temporarily storing said style portion of one of said job words identified by said code word as the object transported by said conveyor which is next to enter said spray station;

location indicating means including a pulser for producing a train of voltage pulses when one of said objects transported by said conveyor enters said spray station, and an increment counter, coupled to said pulser, for counting said pulses;

a style comparator coupled between said style register and said memory, producing a style compare signal when said style portion of the job word stored in said style register corresponds to the style word instantaneously addressed by said memory;

an increment comparator, coupled between said increment counter and said memory, producing an increment compare signal when the number counted by said increment counter corresponds to said position portion of the style word instantaneously addressed by said memory;

logic means, coupled to said increment comparator and said style comparator, producing a trigger signal upon coincidence of both an increment compare signal and a style compare signal;

a color register coupled to said memory for storing a portion of the job word corresponding to the color to be applied to the next object to be painted;

a color comparator, coupled between said color register and said memory, causing a color signal to be produced when said color portion of the job word stored in said color register corresponds to the color word instantaneously addressed by said memory;

color operation means, responsive to said color signal, causing said spray gun to be supplied with the paint color applicable to the next object passing through said spray station; and style operation means, coupled to said logic means, for positioning and actuating said spray gun upon receipt of said trigger signal to paint the next object passing through said spray station.

12. A paint spray control system, for controlling a paint spray apparatus including a paint spray station having at least one spray gun and conveyor means for transporting objects of diverse styles past said spray gun, comprising:
- memory means, advanceable through a plurality of addresses;
- input means for depositing in selected addresses of said memory means a first set of data words, some of said data words in said first set representing the position of an object of predetermined style relative to said spray station; a second set of data words, one of the words in said second set being representative of the style of one of said objects transported by said conveyor means; and at least one code word identifying which of said objects on said conveyor means is the next to enter said spray station; and a plurality of instruction words, corresponding to each of said data words in said first set of data words, indicative of a predetermined operation to be performed by said spray gun;
- style means, coupled to said memory means, for storing style information from said one of said second set of data words identified by said code word;
- location indicating means for instantaneously representing the position of one of said objects transported by said conveyor means relative to said spray station;
- comparison means, coupled to said memory means, said style means and said location indicating means for producing an energization signal after said memory means have advanced to the particular data word in said first set representing the position of an object corresponding to that represented by said location indicating means, and the style of an object corresponding to that stored in said style means; and
- operation means, coupled to said memory means and said comparison means, for receiving the instruction word corresponding to said particular data word in said first set.

13. The paint spray control system set forth in claim 12 wherein said operation means include means, coupled to said spray gun, for causing said spray gun to operate in accordance with said predetermined operation represented by said operation word corresponding to said particular data word in said first set.

* * * * *

UNITED STATES PATENT AND TRADEMARK OFFICE
CERTIFICATE OF CORRECTION

PATENT NO. : 3,989,003

DATED : November 2, 1976

INVENTOR(S) : John C. Fagan
Robert M. Bania

It is certified that error appears in the above—identified patent and that said Letters Patent are hereby corrected as shown below:

Column 1, line 49, "1971" should be --1972--.
Column 3, line 61, delete "decimal data" and insert --"decimal data"--.
Column 4, line 14, delete "words 1" and insert --"words 1"--.
Column 4, line 24, delete "binary data" and insert --"binary data"--.
Column 4, line 40, delete "0017" and insert --"0017"--.
Column 4, line 44, delete "1152" and insert --"1152"--.
Column 4, line 52, delete "0010" and insert --"0010"--.
Column 4, line 55, delete "0001" and insert --"0001"--.
Column 4, line 58, delete "0002" and insert --"0002"--; delete "0003" and insert --"0003"--; delete "0100" and insert --"0100"--.
Column 5, line 17, delete "0010" and insert --"0010"--.
Column 5, line 18, delete "2374" and insert --"2374"--.
Column 5, lines 19, 29, 61, 64, delete "0010" and insert --"0010"--.
Column 5, lines 22, 27, 28, 62, delete "2374" and insert --"2374"--.
Column 5, lines 28, 68, delete "4114" and insert --"4114"--.
Column 6, line 2, delete "2374" and insert --"2374"--.
Column 6, lines 3, 5, delete "0010" and insert --"0010"--.
Column 6, line 6, delete "5196" and insert --"5196"--.
Column 6, lines 21, 26, delete "0001" and insert --"0001"--.

UNITED STATES PATENT AND TRADEMARK OFFICE
CERTIFICATE OF CORRECTION

PATENT NO. : 3,989,003

DATED : November 2, 1976

INVENTOR(S) : John C. Fagan
Robert M. Bania

It is certified that error appears in the above-identified patent and that said Letters Patent are hereby corrected as shown below:

Column 8, lines 51,52, delete "1" and insert --"1"--.
Column 9, line 17, after "as job word 1" insert --, bit 5--.
Column 9, lines 23, 43, 63, delete "1" and insert --"1"--.
Column 9, line 43, delete "0" and insert --"0"--.
Column 10, line 3, delete "1" and insert --"1"--.
Column 10, line 10, after "first two" insert --decimal--.
Column 10, line 31, delete "73a-71q" and insert --73a-73q--.
Column 10, lines 34, 36, delete "clear key" and insert --"clear" key--
Column 10, line 49, after "70a" insert --of--.
Column 10, line 60, delete "date" and insert --data--.
Column 11, lines 49, 50, 51, the words "G. Operation of Exemplary Spray Station Control Circuity" should be rubric instead of text.
Column 11, line 59, delete "1" and insert --"1"--.
Column 11, line 67, after "a WRITE" insert --pulse--.
Column 12, lines 4, 41, delete "to a 1" and insert --to a "1"--.
Column 12, line 4, delete "0" and insert --"0"--.
Column 12, line 14, delete "corredsonding" and insert --corresponding--.
Column 12, line 22, delete "1001" and insert --0001--.
Column 12, line 43, after "next following" insert --job--.

Column 17, line 22, delete "rerpresented" and insert --represented--.
Column 17, line 57, underscore "not".
Column 18, line 6, delete "wod" and insert --word--.

UNITED STATES PATENT AND TRADEMARK OFFICE
CERTIFICATE OF CORRECTION

PATENT NO. : 3,989,003

DATED : November 2, 1976

INVENTOR(S) : John C. Fagan
Robert M. Bania

It is certified that error appears in the above-identified patent and that said Letters Patent are hereby corrected as shown below:

Column 18, line 32, underscore "no".
Column 19, line 57, delete "1" and insert --"1"--.

Signed and Sealed this

Thirteenth Day of February 1979

[SEAL]

Attest:

RUTH C. MASON
Attesting Officer

DONALD W. BANNER
Commissioner of Patents and Trademarks